United States Patent
Sacks et al.

(10) Patent No.: US 10,713,923 B1
(45) Date of Patent: Jul. 14, 2020

(54) SYSTEM AND METHODS FOR USING BLUETOOTH AND GPS TECHNOLOGIES TO ASSIST USER TO AVOID LOSING EYEGLASSES

(71) Applicant: FetchFind LLC, Portland, OR (US)

(72) Inventors: Ann Sacks, Portland, OR (US); Sean S. McGinley, Providence Forge, VA (US)

(73) Assignee: FetchFind LLC, Portland, OR (US)

( * ) Notice: Subject to any disclaimer, the term of this patent is extended or adjusted under 35 U.S.C. 154(b) by 0 days.

(21) Appl. No.: 15/784,503

(22) Filed: Oct. 16, 2017

Related U.S. Application Data

(60) Provisional application No. 62/456,439, filed on Feb. 8, 2017, provisional application No. 62/420,309, filed on Nov. 10, 2016.

(51) Int. Cl.
| | |
|---|---|
| *G08B 21/24* | (2006.01) |
| *G02C 11/00* | (2006.01) |
| *H04M 1/725* | (2006.01) |
| *H04W 4/80* | (2018.01) |

(52) U.S. Cl.
CPC .............. *G08B 21/24* (2013.01); *G02C 11/10* (2013.01); *H04M 1/7253* (2013.01); *H04M 1/72525* (2013.01); *H04M 1/72566* (2013.01); *H04W 4/80* (2018.02)

(58) Field of Classification Search
USPC ........................................................ 455/41.2
See application file for complete search history.

(56) References Cited

U.S. PATENT DOCUMENTS

| | | | | |
|---|---|---|---|---|
| 7,973,657 B2* | 7/2011 | Ayed | ............... | G08B 21/0277 340/539.11 |
| 8,112,037 B2* | 2/2012 | Ketari | ................... | H04L 63/068 455/41.3 |
| 2007/0191002 A1* | 8/2007 | Ge | ..................... | H04M 1/72516 455/426.1 |
| 2007/0224980 A1* | 9/2007 | Wakefield | .......... | G08B 13/1427 455/418 |
| 2008/0014869 A1* | 1/2008 | Demirbasa | .............. | H04M 1/67 455/41.2 |
| 2008/0062120 A1* | 3/2008 | Wheeler | .............. | G08B 25/016 345/156 |

(Continued)

FOREIGN PATENT DOCUMENTS

CN      203965751 U    * 11/2014

OTHER PUBLICATIONS

Chen, Jie, CN-203965751 Translation, dated Nov. 2014 (Year: 2014).*

*Primary Examiner* — Yuwen Pan
*Assistant Examiner* — Erica L Fleming-Hall
(74) *Attorney, Agent, or Firm* — DASCENZO Intellectual Property Law, P.C.

(57) ABSTRACT

A system, device and processes that can provide a user with a way to prevent the loss or misplacement of their eyeglass frames (or other item) in the situation in which the eyeglasses (or other item) has been taken off and placed on a table, or otherwise left behind, etc. Embodiments of the invention incorporate a wireless communications technology, such as a Bluetooth module or similar functional module that is embedded into the eyeglass frame during manufacture and is therefore an integral part of the frame. In the case of an item other than eyeglass frames, the Bluetooth module may be embedded into a clasp, link, setting, or a part of a device (such as a laptop computer).

20 Claims, 6 Drawing Sheets

(56) References Cited

U.S. PATENT DOCUMENTS

| | | | | |
|---|---|---|---|---|
| 2008/0214111 | A1* | 9/2008 | Moshir | H04M 1/66 455/41.2 |
| 2009/0058670 | A1* | 3/2009 | Sweeney | G08B 21/023 340/686.1 |
| 2009/0075593 | A1* | 3/2009 | Demirbasa | G08B 13/1427 455/41.2 |
| 2009/0088221 | A1* | 4/2009 | Gilbert | H04M 1/72566 455/567 |
| 2010/0184378 | A1* | 7/2010 | Wakefield | G08B 13/1427 455/41.2 |
| 2010/0304719 | A1* | 12/2010 | Deep | H04M 1/72566 455/413 |
| 2011/0273275 | A1* | 11/2011 | Ruizenaar | G06Q 10/087 340/10.1 |
| 2012/0064921 | A1* | 3/2012 | Hernoud | H04W 4/029 455/456.6 |
| 2013/0316744 | A1* | 11/2013 | Newham | H04M 19/04 455/458 |
| 2014/0111307 | A1* | 4/2014 | Ingrassia, Jr. | G08B 13/1427 340/8.1 |
| 2015/0350051 | A1* | 12/2015 | Lincoln | H04L 67/18 709/224 |
| 2016/0127862 | A1* | 5/2016 | Beattie, Jr. | H04W 4/02 455/456.1 |
| 2016/0135000 | A1* | 5/2016 | Ge | H04M 1/72516 455/41.2 |
| 2016/0307381 | A1* | 10/2016 | Siebels | G06F 21/35 |
| 2017/0004648 | A1* | 1/2017 | Li | G02B 27/017 |
| 2017/0084151 | A1* | 3/2017 | Beaty | G08B 21/0272 |
| 2017/0115129 | A1* | 4/2017 | Lee | A61B 5/486 |
| 2017/0127226 | A1* | 5/2017 | Allen | G08B 21/24 |
| 2017/0134898 | A1* | 5/2017 | Vega | H04W 4/023 |
| 2017/0325065 | A1* | 11/2017 | Azam | H04L 67/26 |
| 2018/0025595 | A1* | 1/2018 | Ingrassia, Jr. | G08B 13/1427 340/8.1 |
| 2018/0122202 | A1* | 5/2018 | Brantley | G08B 21/24 |
| 2018/0144295 | A1* | 5/2018 | Engel | G06Q 10/0833 |
| 2018/0227393 | A1* | 8/2018 | Daub | H04L 67/20 |

* cited by examiner

SYSTEM AND METHODS FOR USING BLUETOOTH AND GPS TECHNOLOGIES TO ASSIST USER TO AVOID LOSING EYEGLASSES

CROSS REFERENCE TO RELATED APPLICATION

This application claims the benefit of U.S. Provisional Application No. 62/420,309, entitled "System and Methods for Preventing Loss of Eyeglasses," filed Nov. 10, 2016 and also the benefit of U.S. Provisional Application No. 62/456,439, entitled "System and Methods for Using Bluetooth and GPS Technologies to Assist User to Find Eyeglasses," filed Feb. 8, 2017, both of which are incorporated herein by reference in their entirety (including Appendices) for all purposes.

BACKGROUND

People often cannot find an item such as their eyeglasses, which may be used and then taken off numerous times during the day. This is particularly true for glasses that are not required to be worn by a person full-time, such as sun glasses or reading glasses. Although a person may have a general idea of where they last remember having used their glasses, that knowledge may be insufficient to locate the glasses when they are needed. Furthermore, when someone needs their glasses, it is typically urgent and they do not wish to spend much time looking. Note that a similar situation may apply to other high value objects, such as a ring, a bracelet, a laptop computer, an e-reader or other portable device, etc. When these are misplaced or feared lost, the owner may become quite anxious, as they need to find the object either to use it or to confirm that it is safely in their possession.

Methods and devices have been developed that can provide some assistance; for example, an external holder or pouch containing a RFID tag may be attached to the frame of a person's eyeglasses or to another item. While in theory this provides a capability to locate the person's glasses (or the item) based on the tag's response to an activation signal or the detection of a passively emitted signal, the attached device is cumbersome and may alter the look and/or comfort of the frames (or of the item, or interfere with its utility). Furthermore, once a person is out of range of the emitted signal (such as after they have left a room where they placed their eyeglasses or other item), they have no easy and reliable way of knowing where their glasses or the item is, or at which of multiple possible places the glasses or item was actually left.

Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are related to a system, device and processes that can provide a user with a way to prevent the loss or misplacement of their eyeglass frames (or other item) in the situation in which the eyeglasses (or other item) has been taken off and placed on a table, or otherwise left behind, etc. Embodiments of the invention incorporate a wireless communications technology, such as a Bluetooth module or similar functional module (which may be in the form of a printed circuit board or encapsulated unit) that is embedded into the eyeglass frame during manufacture and is therefore an integral part of the frame. In the case of an item other than eyeglass frames, the Bluetooth module may be embedded into a clasp, link, setting, or a part of a device (such as a laptop computer).

The mobile device application described herein will pair (or otherwise control the pairing of) the embedded Bluetooth module with the smartphone or other device in which the application is installed. After a successful pairing operation, the application will enable the smartphone or other device to receive or otherwise obtain data stored in the module memory, where this data may include one or more of an identifier for the module, an identifier for the frames or item in which the module is embedded, configuration data for the signal (e.g., a "heartbeat" or other form of transmission) that will be emitted by the module, etc. Once this data is obtained by the application/smartphone, the smartphone/device will send the data provided by the embedded module (such as by being broadcast by the module, or otherwise obtained from it) and stored in the embedded module memory (including, for example, frame name recognition, an identifier in the form of a MAC address) to a remote server. The server may be hosted "in the cloud" as a service platform, with suitable redundancy and security/access and control protocols, and may also store user information (such as name, address, contact information) that a consumer (the purchaser of the frames) provided during a registration process.

The remote server or service platform may be operated by (or for) a manufacturer of the frames, a seller of the frames, or a 3rd party that provides a registration and recovery service to owners of items containing an embedded module. The service platform may be a form of multi-tenant platform in which each owner or each supplier of protected items has a separate account, and the services provided (such as registration, recovery of a lost item, assistance with finding an item, etc.) are a form of Software-as-a-Service (SaaS).

The mobile device application may have the ability to be used to configure or reconfigure certain aspects of the operation of the module, such as the signal or heartbeat frequency. Note that the data or information stored in the module memory may be supplied by a manufacturer or other source during part of the manufacture or activation process. For example, in the case of eyeglass frames, an optometrist or other provider of the frame may scan the frames with a "reader" or other source of activation to read, and or, write data into or from the memory, where this data may include a frame identifier, source identifier, recovery data, contact data, etc.

Once configured and operating, the embedded or implanted module emits a regular signal or "heartbeat" which is detected by a person's mobile device that has been equipped with the application that is part of the system. As noted, in some cases, the timing or frequency of the emitted signal or heartbeat may be configurable. Further, in some cases the timing with which the application causes the mobile device to attempt to detect the emitted signal or heartbeat may be configurable (e.g., a "polling" operation may be configured to be executed, and may be made to be triggered or to vary based on time, a time interval, a received signal strength, an assumed distance from the source of the signal or heartbeat, a change from a first signal strength level to a second level (such as from "high" to "low"), etc.).

In some embodiments, a sufficient decrease in the strength of a received signal (e.g., the heartbeat) or distance from the signal source (as indicated by a change in signal strength) may be used to trigger an alert, tone, image, message, etc. which is generated by the mobile device in response to instruction from the installed application. In some embodiments, when the received signal strength reaches a specified limit or threshold (such as falling to a specified level or relative signal strength, or becoming undetectable), the application installed in the mobile device may trigger or initiate a GPS "fix" to determine the location of the owner of the glasses (or other item) when the owner was presumably leaving or about to leave the vicinity of their glasses or other item.

The installed application enables a user to configure the alerts, with regards to one or more of type of alert (visual, auditory, haptic), conditions under which it is generated (based on strength of received signal, relative strength of signal, decrease in signal, increase in signal strength as user approaches item, triggering of GPS fix), whether alerts are repeated, etc. Note that the alerts may also be configured to change by increasing volume, frequency, etc. as the signal becomes stronger; in this way the alerts can be used to lead someone to the frames, with the mobile application enabling the mobile device to function as a form of "Geiger counter" for the emitted signal.

As noted, in the case of eyeglass frames, conventional prescription eyewear, sunglasses, and reading glasses do not include the technology or capabilities to assist consumers to locate their frames without using some sort of external hardware attached to a part of the outer frame. However, aside from comfort and the impact on the style or fashion of the eyeglass frames, there are other disadvantages to the use of an external tracking device. Unlike such external add-on devices, the use of an embedded or implanted module has significant advantages, as such modules are inherently protected from impacts, abrasion and other hazards of the environment and handling. Further, such modules do not become obscured by dirt or grime and are not affected by water. In addition, embedded modules will not fall off due to an adhesive becoming brittle.

In one embodiment, the invention is directed to a system for assisting a user to avoid losing an item or to retrieve an item. The system includes a module embedded or implanted in the item, where the module includes a transmitting element operating to transmit a signal which is received by a mobile device. The system further includes an application installed or capable of being installed in the mobile device, where the application includes a set of executable instructions, which when executed by a programmed electronic processor in the device, enable the device and/or user to perform the operations or functions below:

generate and display a user interface for the user, the interface including one or more of a screen, display or field into which the user may input information;

configure a set of alerts to be generated by the mobile device in response to the detection or lack of detection of the signal transmitted by the module, where configuring the set of alerts includes specifying a type of alert and a corresponding triggering event for the type of alert, with the set of alerts being configured in response to an input or inputs received from the user at the user interface;

initiate a process to use a location determining technology contained in the mobile device upon satisfaction of a specified condition regarding the received signal strength; and cause the mobile device to generate at least one of the set of alerts in response to satisfaction of the corresponding triggering event.

In another embodiment, the invention is directed to a method of assisting a user to avoid losing an item or to retrieve an item. The method includes performing the operations or functions below:

forming the item with an embedded or implanted module, or embedding or implanting a module into the item, the module including a transmitting element operating to transmit a signal received by a mobile device;

providing the user with an application capable of being installed in the mobile device, the application including a set of executable instructions executable by a programmed electronic processor in the device;

generating and display a user interface for the user, the user interface including a screen, display or field into which the user may input information;

configuring a set of alerts to be generated by the mobile device in response to the detection or lack of detection of the signal transmitted by the module, where configuring the set of alerts includes specifying a type of alert and a corresponding triggering event for the type of alert, the set of alerts being configured in response to an input or inputs received from the user at the user interface;

initiating a process to use a location determining technology contained in the mobile device upon satisfaction of a specified condition regarding the received signal strength; and causing the mobile device to generate at least one of the set of alerts in response to satisfaction of the corresponding triggering event.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1A:
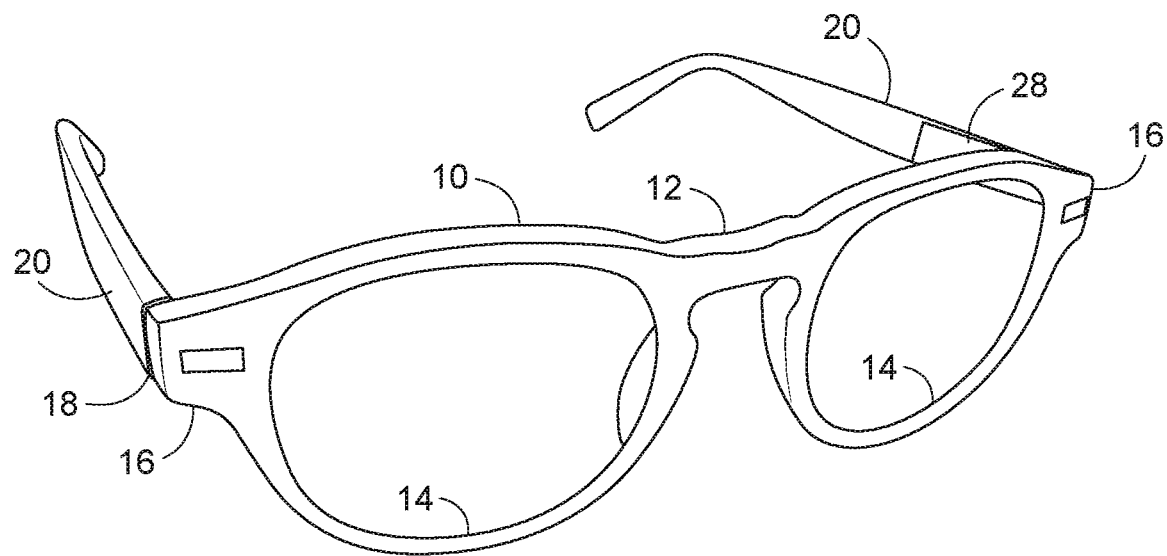
FIGS. 1(a) and 1(b) are diagrams illustrating a module embedded in an exemplary eyeglass frame, according to aspects of the present invention. Note that, in other embodiments, the Bluetooth or similar tracking module may be embedded in one or more different areas of the eyeglass frame.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

In some embodiments, the system and methods described herein are directed to a pair of eyeglasses with an embedded or implanted transmitting module, a mobile device application and related processes that can provide a user with a way to prevent the loss or misplacement of their eyeglasses. Some embodiments incorporate a wireless communications technology, such as a Bluetooth (BT) capable transmitter module, that is embedded or implanted into the eyeglass frame. In one embodiment, the module is a Bluetooth Low Energy (BLE) module, which may provide advantages (such as size) in certain use cases. This module is used to "pair" the frames with a smartphone or other mobile device. An application installed on the mobile device enables the mobile device to receive and monitor a "heartbeat" or other signal emitted by the Bluetooth module. The detection of the signal or heartbeat is used to indicate that the user is in range or nearby the eyeglasses, is out of range of the transmitter, or is moving away or moving towards the eyeglasses.

When the signal or heartbeat is no longer detected (or its signal strength has decreased to a specified level or amount relative to the initial signal strength), the application causes the mobile device to generate a suitable alert, such as one or more of an audible, visual, or vibrational indicator. This lets the user know that they are leaving or have just left the vicinity of their eyeglasses. This provides the user with a warning that they may be about to lose their eyeglasses and causes them to look for them in a defined region (typically a room or region representing the reception range of the transmitted signal). Similarly, a user may use the installed application to configure an alert or alerts to be generated (or use the same as those configured for a decreasing signal strength) to assist in locating the misplaced item, by changing the alert as the user gets closer to the item (i.e., as the signal strength increases).

In some embodiments, the inventions described herein may be implemented in the form of an Eyeglass Frame System that includes an application installed on a mobile device (such as the user's phone) and a passive or active transmitter module embedded or implanted into an eyeglass frame, where the transmitter module may be based on Bluetooth or on a wireless technology that is capable of performing a similar function (such as RFID tag, or other form of passive or active transmitting device). As noted, in one embodiment, the module is a Bluetooth Low Energy (BLE) module, which may provide advantages (such as size) in certain use cases.

In the example embodiment of a Bluetooth Low Energy module (or other form of transmitter) being embedded or implanted into another type of item, the system and methods may be used to alert a user that they are about to leave the vicinity of the other item, where this item may be a ring, bracelet, necklace, watch, or portable electronic device (such as a laptop computer, tablet computer, or e-reader). For example, a BLE module may be embedded or implanted into the setting of a ring, a clasp of a necklace or bracelet, or into the case of the electronic device. When the protected item is in danger of being left behind, the owner's mobile device (such as their smartphone) will generate an alert.

Further, in one embodiment, the implanted or embedded module may be capable of receiving a command from the mobile device application, and in response may operate to cause an electronic device in which it is embedded to generate a visual, auditory, or other form of alert. In this embodiment, a user who leaves the vicinity of their laptop or tablet computer may receive an alert on their mobile phone, but in addition, the laptop or tablet may generate an alert, such as an auditory tone or tones. This embodiment may be implemented by installing a module or program into the laptop or tablet that uses Bluetooth (or other suitable communication mode) to receive an instruction from the application installed in the mobile phone, and in response, to issue a command or instruction to the laptop or tablet. The command or instruction causes the laptop or tablet to generate the desired alert or alerts. For example, the application may cause the mobile phone to transmit an instruction or command using Bluetooth, with the module in the laptop or tablet receiving the instruction or command and then accessing a suitable API in order to cause the laptop or tablet emit a tone, etc. Thus, in this embodiment, both the owner's smartphone and the protected device may be caused to generate an alert.

Note that in another embodiment, the protected item may itself have the ability to generate a visual, auditory, or other form of alert or signal. For example, an eyeglass frame may be fabricated to include a source of light (such as an LED)

that is activated by a signal from the mobile device application. This may require the use of a Bluetooth transceiver in the embedded or implanted module so that the frames can receive a signal from the mobile device, and in response cause the source of a visual or auditory alert to generate an alert. Control logic in the form of firmware may be included in the module to respond to the received signal by initiating or otherwise controlling the generation of an alert. This embodiment enables the eyeglass frames to be used to alert the wearer that they may be at risk of losing or leaving behind their mobile device or smartphone.

Similarly, an eyeglass frame may be fabricated to include a small speaker or other device for outputting an auditory signal in response to a signal from the mobile device application. Depending on the type of protected item, a source of light or source of an auditory tone or signal may be fabricated to be part of the item. Further, as mentioned, a Bluetooth transceiver may be used to replace the Bluetooth transmitter in the implanted or embedded module. The transceiver may receive a signal from the user's mobile device (such as their smartphone) when the heartbeat or other signal is reduced to a specified level, and in response may cause a visual or auditory alert to be generated. The embedded or implanted module may also contain firmware that controls the operation of the source of the visual or auditory alert in response to the received signal from the mobile device. As with the embodiment described above, this embodiment enables the eyeglass frames to be used to alert the wearer that they may be at risk of losing or leaving behind their mobile device or smartphone.

Certain aspects of the heartbeat or other signal and the mobile device's response to the detection or lack of detection of the signal may be configured by the user, by reference to the user interface of the installed application. These aspects may include one or more of the type of alert or alerts generated, conditions on when an alert is generated or the type of alert generated (based on location, surroundings, a user's calendar or event schedule, etc.), the frequency with which the heartbeat or other signal is emitted, whether an alert is generated in response to a decreasing signal strength (suggesting that the user is moving away from the item, or at least that the mobile device is moving away), an increasing signal strength (suggesting that the user or mobile device is moving towards the item), or both, how often and what may trigger a "polling" operation by the mobile device to attempt to detect the emitted signal, etc.

Embodiments of the invention assist an owner of a pair of eyeglasses (or in some cases, other high value and easily misplaced items) to locate and retrieve their glasses before leaving the vicinity of the glasses or other item. In some embodiments, this is accomplished by embedding or sealing a module or transponder in the eyeglass frames themselves. This permits the signal emitting technology to be part of, and integrated with, the frames, so that the comfort and appearance of the frames is not disturbed. This provides consumers with a variety of stylish eyeglass frames that can be found and retrieved before they become "lost" using the embedded Bluetooth capable module (or other wireless signal indicator technology). Unique identification information that is associated with the Bluetooth module (or other embedded or implanted module) may be stored in a database and used to return the eyeglasses to their owner if the glasses are found by another person.

Embodiments of the eyeglass frames and associated methods described herein will provide consumers with a mechanism to prevent the loss of their prescription, sunglasses, and reading glasses. As mentioned, during manufacture, the frames are modified to allow a wireless signal source to be embedded inside the frames. When the embedded Bluetooth technology enabled frames are paired to a smartphone or other mobile device using the mobile application described herein (for any suitable OS, such as Windows, IOS, Android, Linux, etc.), the embedded Bluetooth technology signal source in the frame will enable a user to determine when they are leaving the vicinity of their eyeglasses (or have moved far enough away from their frames to cause a specified decrease in, or loss of, the heartbeat or other signal). Thus, if the consumer user misplaces or temporarily cannot find their frames, the frames may be found and retrieved. In one embodiment, as the consumer gets closer in proximity to their frames, the installed mobile device application may sound an alert or vibration, or increase the frequency of a sound, vibration, or pattern of the same.

In some embodiments, the installed application may permit a user (e.g., the owner of the eyeglasses or other item) to perform one or more of the following, typically by accessing a suitable user interface (such as a touch screen icon, keypad, etc.):

configure the frequency of the emitted signal (e.g., once per second, once per 10 seconds, etc.)—this may instead be configured when the module is implanted in the frames. Note that in some implementations, this signal frequency may be set to correspond to a polling frequency specified by an operating system or other constraint designed to preserve battery life, etc.);

similarly, a "polling" frequency with which the mobile device "seeks" the signal transmitted by the embedded module may be controlled or otherwise set by a device operating system in order to preserve battery life (such as by the IOS guidelines for an Apple device);

specify the nature of any alert (one or more of audible, visual, text, vibrational) that is generated by the application and perceived via the mobile device when the signal cannot be detected or has reduced (or increased) in signal strength by a specified amount or relative amount, and therefore it is presumed that the user has left or is leaving (or is moving closer to in the case of an increasing signal) the vicinity of the eyeglasses or item;

note that in some cases this may include specifying the nature of an alert generated by the high value item itself (in situations where the item may be operated to emit or display a sound, image, message, etc.) when the signal cannot be detected or has reduced in signal strength by a specified amount or relative amount. As mentioned, this may be implemented by installation of an application on the high value item that communicates with and responds to commands from the mobile device application, or which otherwise can be configured to initiate an alert of some type (light, audio, etc.) when the owner of the high value item is in danger of leaving it behind. This may alert the owner of the item, or in some cases another person close to the item, that the item requires attention;

configure at what distance the mobile device is from the eyeglasses or item when an alert or a specific type of alert is generated (and/or at what signal strength, relative signal strength, or change in signal strength from "high" to "low" or vice-versa);

configure the type of alert (audible, visual, vibrational) that is generated as a function of the distance (or signal strength, or change in signal strength) between the mobile device and the eyeglasses or item;

configure at what signal strength or relative signal strength of a received signal (generated by a Bluetooth (such as BLE) or other signal generating module) the mobile device application triggers or initiates a GPS "fix" to determine the assumed location of the user (and provide the best assumption as to the location of the eyeglasses or other item);

configure the type of alert generated upon triggering of the GPS fix (such as a final visual, auditory, text, or other reminder that the user is about to leave the vicinity of their glasses or item, and may have unintentionally left the glasses or item behind);

configure how the presumed location of the eyeglasses or other item is presented to the user—possible examples include (but are not limited to) a map, directions from a current location to where the eyeglasses or item is assumed to be located, placing of a call to the location where the eyeglasses or item is assumed to be located, sending of a text or other message to someone at the location; and access the user's calendar, notes, contacts, or other indication of the user's expected activity to obtain information that is used to re-configure the application based on the user's activity or location (for example to silence an alert, change an alert from audible to visual, increase the volume of an alert, cause an alert to be generated when the user is a specified distance (or the signal strength has changed from a "high" value to a "low" value or vice-versa) from the eyeglasses or item, even if the heartbeat or other signal can still be detected, etc.).

Although portions of the following description may use the example of an implementation of the system and methods as part of assisting a user to reduce the likelihood of leaving their eyeglasses behind (and of providing information regarding the location where it is believed that the eyeglasses were left), it should be understood that many of the same functions and capabilities may also be used to assist a user to reduce the likelihood of leaving a different item behind. Such other possible uses include, but are not limited to, the protection against loss and assistance in finding one or more of the following items:

a. wallet or purse;
b. jewelry (bracelet, necklace, earrings, watch);
c. tablet or laptop computer;
d. computer bag or travel bag;
e. expensive tools (multi-meter, tester, gas leak detector, network analyzer, signal analyzer, etc.); or
f. electronic devices (radio, portable stereo).

Figure 1B:
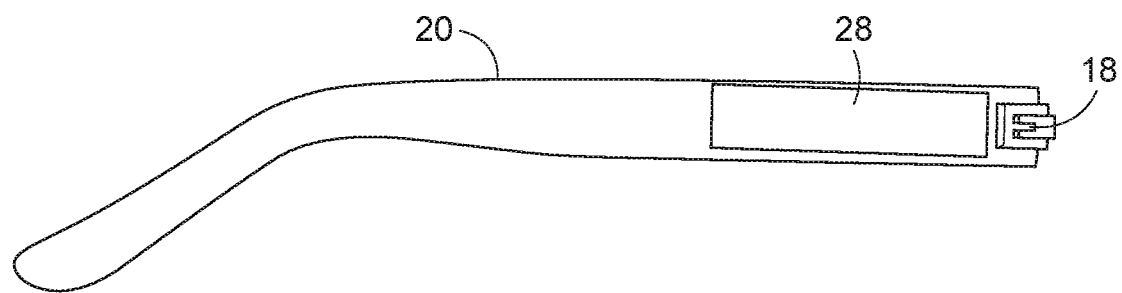

FIG. 1(a) is a diagram illustrating a top angled view of the Fetch Eyewear "Bella" Frame as used for sunglass lenses, with an embedded Bluetooth module. FIG. 1(b) is a diagram illustrating a front view of the Fetch Eyewear "Bella" Frame as used for clear lenses, with an embedded Bluetooth module. Note that the Fetch Eyewear Bella frame is not a requirement of an embodiment of the invention, and is shown as an example of a frame in which a Bluetooth or similar tracking module could be embedded.

As shown in the figure, a pair of eyeglass frames may include the following elements or components, with the indicated identifying numbers:

10—the frame front, the front face of the frame which bridges the top of the wearer's nose;

12—the bridge, the portion of the frame that goes over the wearer's nose;

14—rims or channels (partial or whole), which together operate to hold the lenses in position;

16—end pieces, extensions of the frame to which the temples are attached;

18—hinges, the part of the frame that connects the frame front to the temples;

28—embedded or implanted transmitting module, such as a BT module (where the module may be activated by a scanning device and contain its own source of power) Among other sources, Selteka (http://www.selteka.eu/en/c/solutions-technology/electronic-manufacturing-services/) may provide a BLE or other form of module suitable for use in implementing an embodiment of the system. Note that other sources may also be able to provide a suitable module; for example, sources used to provide a Bluetooth or other form of wireless communication capability in a device or use case such as:

Healthcare, sport and fitness devices, such as physical activity monitors, thermometers, blood pressure monitors, blood oxygen monitors, blood sugar monitors, or heart rate monitors;

Wearable devices such as smart bracelets, watches, rings, glasses and clothing;

Home and entertainment devices such as beacon systems, thin card devices, remote controls, sensor tags, toys, or lighting systems; or Computer peripheral devices such as mice, keyboards, stylus pens or presentation pointers.

Note that the Bluetooth or other wireless transmitter module could be placed in the temples and/or end pieces of a frame. In one example, a Bluetooth module may be embedded into a section a section of the Eyeglass Frame during an injection mold process.

Although embodiments of the system and methods described herein are not tied to any particular manufacturing process, the following description is intended to provide background and information regarding a suitable process for manufacturing a pair of eyeglass frames in which a BT module is embedded or implanted.

Raw Materials

Eyeglasses frames are typically made of metal or a type of plastic called cellulose-acetate. Cellulose acetate is derived from cotton and is flexible and strong. It is produced in long narrow sheets that slightly wider than eyeglass frames. The sheets are up to 3 ft. (0.91 m) long and 0.33 in (0.84 cm) thick.

The Manufacturing Process: Die-Cutting Plastic Frames

An injection mold or molding device is typically used. With the thermostat adjusted to the desired temperature, a mold of the frame is placed in the machine with the spruce hole on top of the mold lining up with the injection nozzle. Note that inexpensive homemade molds can be made using an epoxy or urethane resin, or by machining a desired cavity into an aluminum block using a bench top CNC machine. Add the plastic/cellulose acetate material and apply pressure. There will be a solid resistance when the mold cavity is full. Maintain the pressure for a few seconds and then release the pressure. Remove the mold from the machine. Take the Bluetooth module (BT module) with an epoxy encasement and slide in (top down) angled into the part of the frame that will house the module. Wait for the molten plastic to cool in the mold for a short time (typically about 10 minutes, depending on size and shape of part); unclamp the mold and remove the frames. Trim away any excess plastic (i.e. flash). Note that the frame material may include, but is not limited to, Cellulose Acetate, Cellulose Propionate, Nylon, Monel, Titanium, Beryllium, Stainless Steel, Flexon, and Aluminum.

Note that during manufacture or at a later time, a symbol or icon may be stamped or etched into the frames in order to alert the owner or anyone finding the frames that the frames may be used as part of a pairing operation. For example, the universal symbol for Bluetooth may be etched on the inside temple of the frame alongside the frame style name or identifier. This would inform someone that the frames may be used as part of a pairing operation and lead them to connecting with a database of frame owners (or an administrator of such a database), and eventually to the return of frames that have been misplaced or lost by the owner.

Figure 2:
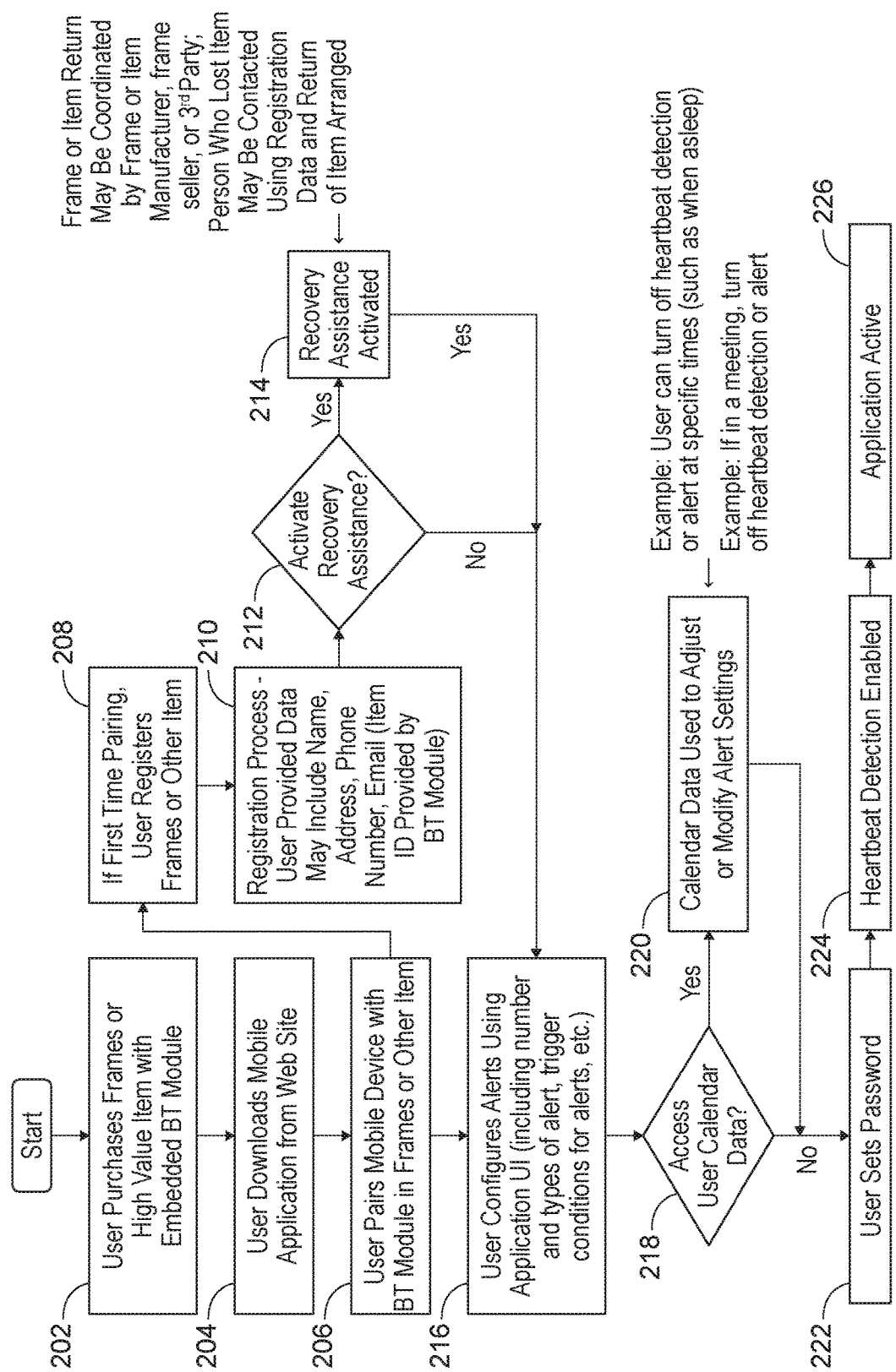
FIG. 2 is a flowchart or flow diagram illustrating a method, process, operation, or function(s) that may be implemented by an embodiment of the inventive system and methods in order to assist a user to not misplace or lose their eyeglasses.

FIG. 2 is a flowchart or flow diagram illustrating a method, process, operation, or function(s) that may be implemented by an embodiment of the inventive system and methods in order to assist a user to not misplace or lose their eyeglasses (or other high value item).

As shown in the figure, in one embodiment a user may purchase an eyeglass frame in which has been embedded or implanted a Bluetooth capable module (as suggested by step or stage 202). At some time (typically afterward), the user downloads the mobile device application from a suitable application store or website (such as for iOS, Android, of Windows devices), as suggested by step or stage 204. Next, the frames are "paired" with the mobile device in which the application is installed (typically a mobile phone), step or stage 206. The pairing operation is performed by any of the usual and suitable methods (such as the mobile phone recognizing the embedded module and the user entering a provided code to cause the pairing operation to be completed).

Once the frames are paired with the application/mobile device, the owner of the frames may register the frames (this is optional and may be done later), as suggested by step or stage 208. This registration may be performed at an indicated web-site, and may include the owner providing their contact information and an identifier for the frames. The identifier may be transmitted to the mobile device application by the embedded module, in which the identifier is stored. During the registration process the owner of the frames may be asked to provide contact information such as name, address, phone number, email, etc. and the frame (and/or in some cases, module) identifier (as suggested by step or stage 210). This information is stored in a database and if agreed to by the owner (which is typically why they chose to register the frames), the information may assist the manufacturer or seller of the frames (or another party) to return the frames to the owner if the frames are left behind and recovered by another party. As shown in the figure, after registration or at a later time, the frame owner may be presented with an opportunity to activate the frame recovery service or process (as suggested by step or stage 212). If they choose to do so, then the frame or item recovery assistance service is activated, as shown at step or stage 214. This service or process may assist a frame owner to recover their misplaced or lost frames by providing a party who can receive the lost frames from a person who finds them, and then provide the frames to the owner.

After performing the registration process (or if it is skipped by the owner), the owner is able to configure or otherwise set the alerts to be generated by the mobile device in response to a command or instruction of the application when the received heartbeat or other signal reaches a certain signal strength level, drops by a certain amount, is no longer able to be detected, etc. (as suggested by step or stage 216). This is done by accessing the user interface for the application, which is able to access the device's APIs in order to cause the device to emit a sound, play a snippet of music, display a screen, etc.

As described herein, the user may configure the type of alert or alerts, as well as the triggering conditions. In one embodiment a set of audible alerts (tones, snippets of music, environmental noises, etc.) may be selected by a user, with each such audible alert being generated in response to a specified condition. The specified conditions may be a relative signal strength (increased or decreased), an assumed distance from the eyeglass frames, a change in signal strength from a "high" value to a "low" value or vice-versa), a loss of the signal, a detection of the signal after a period of no detection, or other suitable and relevant condition. Thus, in operation, as the owner of the eyeglass frames moves further away from (or closer to) the frames, the type and nature of the alert may change (such as becoming louder or softer, of higher or lower frequency, of a different sound, etc.).

Similarly, a user may desire to use a different type or set of alerts, including visual alerts on the mobile device, a combination of visual and auditory, a text message, a haptic alert (such as vibration), or any combination of available alerts. As with the example of auditory alerts, the application user interface may be used to configure the alert or alerts generated and the condition or conditions under which they are generated. The installed application operates to interact with the device's APIs or other entry points to configure how the device and its resources will detect and respond to changes in the received heartbeat or other signal.

After the alerts and (if applicable) conditions for triggering an alert are provided by the user (note that a set of alerts may also be provided as a default by the manufacturer), the application may access the user's calendar or other relevant data stored on the device or available to the device (as suggested by step or stage 218). This is done in order to determine if there are times, days, or events during which alerts should be muted, prevented, or otherwise changed from the user's settings. If such data exists (and presumably because a user desired that the application have access), then the application may take a desired action with regards to the alerts during certain meetings, times, days, situations, etc. (as suggested by step or stage 220, illustrating two possible actions that may be taken, i.e., alerts are prevented or muted during a meeting or during sleep time).

Next (or if the application does not access data to alter the alert settings), the user may be asked to provide a password for access to their settings and/or account. This is suggested by step or stage 222. After a password has been provided and verified, the application will cause the methods described herein to be operative by enabling detection of the emitted heartbeat or other signal by the mobile device (as suggested by step or stage 224). The installed application is also now "active" in that it is controlling the monitoring of the signal and the determination of when an alert should be generated (step or stage 226).

Figure 3:
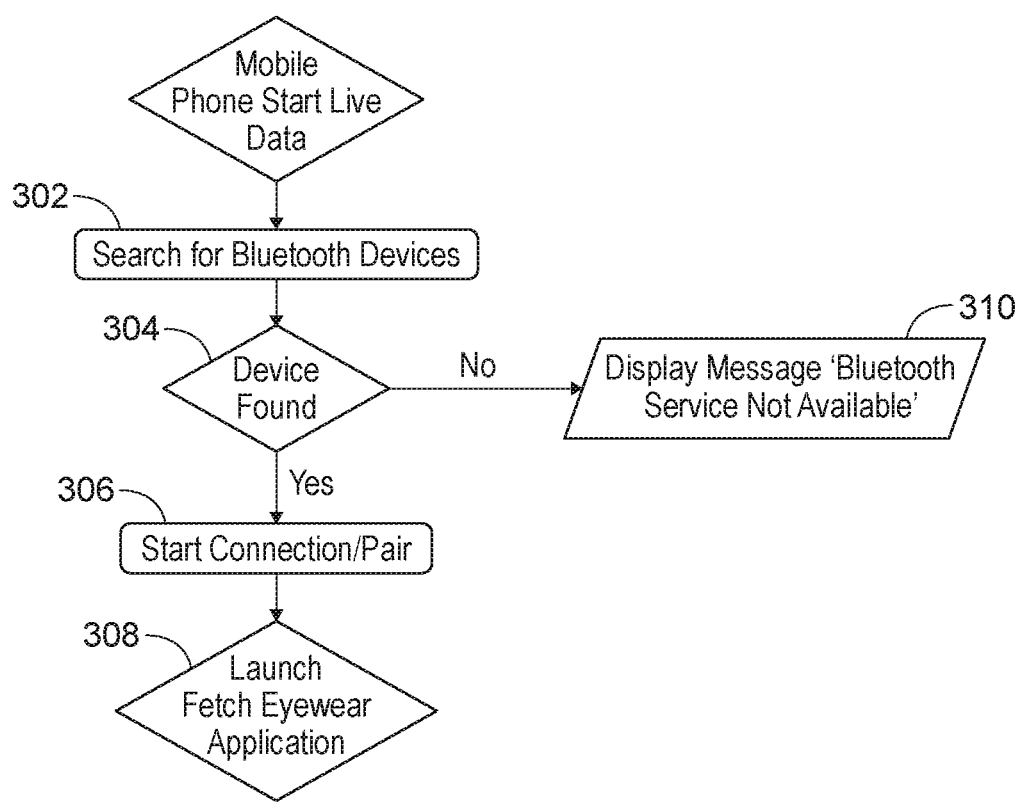
FIG. 3 is a flowchart or flow diagram illustrating a method, process, operation, or function(s) that may be implemented by an embodiment of the inventive system and methods in order to "pair" their mobile device with a Bluetooth or other form of transmitter module that is implanted into an eyeglass frame.

FIG. 3 is a flowchart or flow diagram illustrating a method, process, operation, or function(s) that may be implemented by an embodiment of the inventive system and methods in order to "pair" their mobile device with a Bluetooth or other form of transmitter module that is implanted into an eyeglass frame. This is an example of a typical pairing process in which the mobile device "searches" for Bluetooth capable devices (as suggested by step or stage 302), and if a device is found (as suggested by the "Yes" branch of step or stage 304), then a pairing operation is initiated (as suggested by step or stage 306, and which may involve the exchange of a "key" or code between the emitting module and the mobile device, followed by the device user entering the key or code into the device). In response to successful pairing the application installed on the device may be launched or otherwise activated (as suggested by step or stage 308). If the embedded or implanted module is not detected, then the mobile device may display an error message (step or stage 310).

Figure 4:
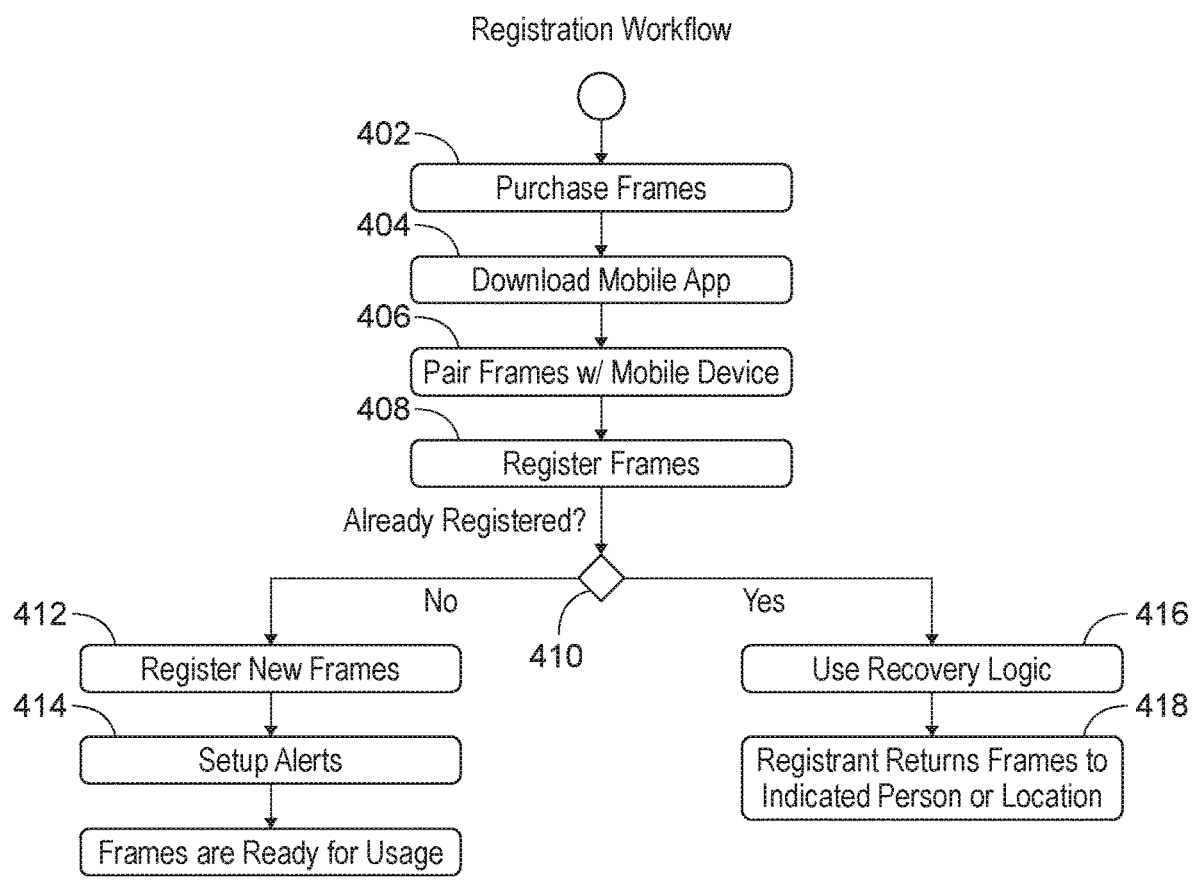
FIG. 4 is a diagram illustrating elements or components some of which may be present in a computing device, mobile device or system configured to implement a method, process, function, or operation in accordance with an embodiment of the invention.

FIG. 4 is a flow chart or flow diagram illustrating a method, process, operation, or function(s) that may be implemented by an embodiment of the inventive system and methods in order to allow a user to register their eyeglasses with a vendor or with a service platform. Note that portions of this description are similar or duplicative of the steps or stages described with reference to FIG. 2. The illustrated process includes the following example steps or stages:

1) User obtains new eyeglass frames that include an embedded Bluetooth module (step or stage 402);
2) User downloads the mobile application (iOS, Android, or other) to register the new frames (step or stage 404);
3) User pairs the frames with their mobile device via Bluetooth signals and under the control of the application (step or stage 406); and
4) User tries to register the new frames (step or stage 408)—in some embodiments, the mobile application (in communication with a server or service platform) determines if the new frames have been registered before (step or stage 410):
   1. If the frames have not been registered before (the "NO" branch of step or stage 410), then:
      i. The application asks the user to provide his personal information and links the user with his new frames using MAC address of Bluetooth hardware or other identifier (step or stage 412);
      ii. The user is asked to configure alerts in case the frames are located away from the phone or mobile device. As an example, the alerts may be divided into 3 (or fewer, or more) groups depending on RSSI (the Received Signal Strength Indicator of the emitted "heartbeat" or other signal, for example) level (step or stage 414).
   2. If the frames have been registered before (the "YES" branch of step or stage 410), then:
      i. The mobile application verifies that the frames have been registered by this user (by checking his/her name and mobile number, the "Recovery Logic", step or stage 416). In this case, the user may continue using the frames;

However, if the frames have been registered by another user, then the mobile application generates an alert and informs the user that the frames should be returned to the place of purchase or another indicated vendor (step or stage 418).

Note that in addition to assisting the owner of the frames or other item to recover the frames/item in the situation in which the owner loses it, registration also permits the retailer or operator of the service platform to provide other value-add services, such as:

Allows a retailer to keep track of Bluetooth frames being used;
Allows a consumer to receive information about the type of frame they purchased
Enhancements
New Colors
New Audible Alert Downloads
Frames or Item cannot be registered more than once If frames are found/stolen and person tries to register the frames, retailer's database server will recognize frames as "Already Registered" and send message asking that the frames be sent back to retailer/platform service provider at no cost to finder.

Figure 6:
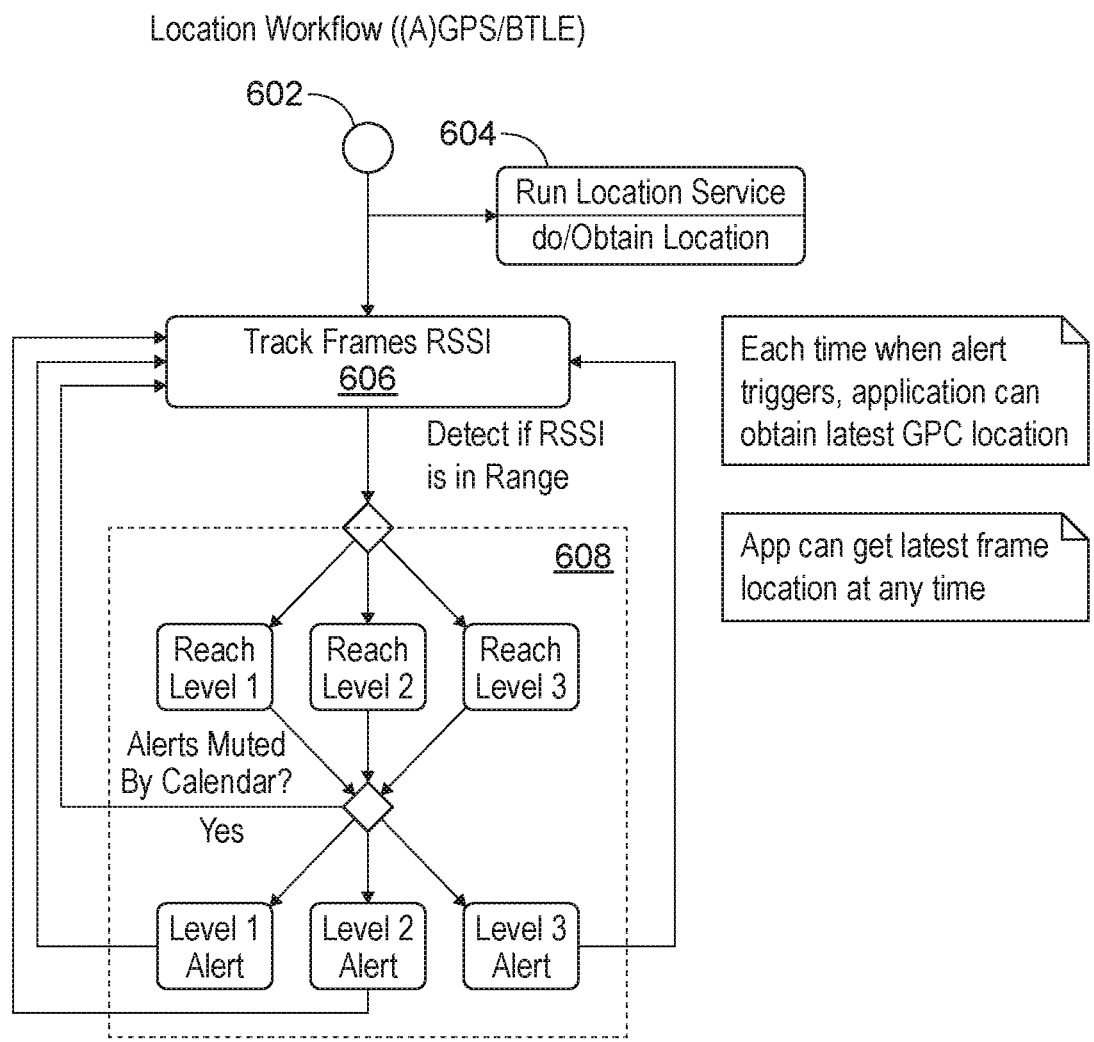
FIG. 6 is a flow chart or flow diagram illustrating a method, process, operation, or function(s) that may be implemented by an embodiment of the inventive system and methods in order to utilize the location determining features of the mobile device in which the application is installed.

FIG. 6 is a flow chart or flow diagram illustrating a method, process, operation, or function(s) that may be implemented by an embodiment of the inventive system and methods in order to utilize the location determining features of the mobile device in which the application is installed. This enables the application to cause the mobile device to initiate a process to determine its location (typically by obtaining a GPS "fix" on its present location, although other methods such as infrastructure communications may also or instead be used) when the heartbeat or other signal has been reduced below a threshold level or can no longer be detected. In a typical example of the process flow, the following steps or stages may be implemented:

1. Location workflow starts after the Frames have been registered using the mobile application. It is running in a cycle (and hence is always active), as suggested by step or stage 602;
2. Location workflows uses GPS/GPS-A and BLE (Bluetooth Low Energy) to locate the Frames; the mobile application installed by the user is able to switch on a process to utilize GPS and to access Location services, as suggested by step or stage 604;
3. As an example, once per X seconds the mobile application may determine the relative strength of the Bluetooth signal/heartbeat (where X may be configured by user), as suggested by step or stage 606; and
4. Depending on the Frame's RSSI (Received Signal Strength Indicator) level, the mobile application determines if an alert should be generated, as suggested by steps or stages 608. Note that several options are possible, including:
   a. The user may configure alerts in such a way that they will be muted/will not be raised if a calendar appointment is active at that time. In this case, the mobile application continues tracking the Frame's location with no or altered alerts; and
   b. If no calendar appointment is active, then an alert is shown/raised. The type of alert (vibration, text message or sound) may be configured to depend on the distance between the mobile device and the Frames (as may be inferred by a change in the signal strength from a "high" value to a "low" value or vice-versa), where, as described, alert types may be configured by the user in the mobile application.

In one embodiment, the control logic in the mobile phone application initiates or triggers a GPS fix, and stores the result (the location or data from which it may be derived) when the Bluetooth heartbeat or other signal is not received for a predetermined number of seconds. The GPS fix represents a best guess as to location of the eyeglasses or other item (based on the location of phone when the signal is lost or decreases sufficiently in value). If a GPS fix is not possible (due to interference, buildings, etc.) a countdown timer will start, and the fix is tried again until successful. The user interface allows the mobile application user to request a display of the location of the GPS fix data on map, along with the user's (or phone's) present location.

The application which is downloaded and installed in the mobile device is capable of providing a user interface to the user for purposes of registration, alert configuration, initiating a process to find or recover the item, etc. For example, the user interface may generate one or more of the following screens, displays or data entry fields for a user:

Start Screen

Main Screen with list of frames registered or able to be selected, and side menu(s)

Info Screen—this screen or display provides the model number and version of the installed application Login Screen Register New User Screen—this screen or display enables a user to register themselves with the service platform for purposes of assisting in the return of a lost item, receiving notifications of new features, making a donation to a selected charitable organization, etc.

Add Frame/Item Screen—this screen or display enables a user to add a frame or item to the set of frames or items associated with the user for purposes of assisting the user to have the frame or item returned Settings—these screens or displays enable a user to configure the alerts and perform other functions (such as setting Proximity, Alerts, Name, Address, Sound, Subscriptions)

User Account Screen—this screen or display shows user name, password (if desired or not obscured), account contact information Device Movement Screen—this screen or display may be part of the configuration process for the alerts, e.g., setting the signal strength at which an alert will be generated Last Frame/Item Location Screen—this screen or display shows the last confirmed location of the mobile device (via obtaining a GPS fix) when the Bluetooth signal from the frames or item decreased below a threshold value (such as a low signal, an undetectable signal, etc.).

Further, in some embodiments, one or more of the following capabilities, operations, processes or functionality may be made available to a user by the application:

User registration and authorization

Setup user name, phone and address (registration data for return of frames)

Setup range and timeouts for notifications

Add new frame or other item

Manage existing frames/items with ability to view their presumed distance from user (note that in one embodiment, this may be based on the received signal strength from the BLE or other module using two zones; a strong signal zone and a weak signal zone. When moving from a strong to weak zone, an alert is sent—for purposes of implementation, the signal level being "strong" or "weak" may be defined in the mobile application as an internal constant).

Give names to the frames/items for ease in distinguishing them

Manage existing frames/items with an ability to view last known location (or a best estimate of that location)

Logic in mobile phone application initiates GPS to be switched on—used to store coordinates of mobile phone/device when BT signal is sufficiently low (as defined in mobile application settings)

Approximate coordinates of the device's location at time of loss or weak BT signal are calculated by GPS/GPS-A and made available to mapping or other applications User interface allows user to request location of the device and display it on a map Plan route to the last known frame/item location and/or contact last known location (using phone call, text message, etc.)

Alert types and conditions upon which generated or altered (text, vibration, sound) can be configured by user in the mobile application Alter Alerts based on calendar or other indicator of events (such as mute alerts during a specific type of event)

Remove existing frames/item from application

Provide a link or contact information for a charitable group or foundation supported by the retailer, lens manufacturer, or service platform operator (e.g., The Pixie Project—Animal Rescue, Adoption and low income veterinary care, a charitable organization supported by the inventors and assignee of the present application)

Figure 5:
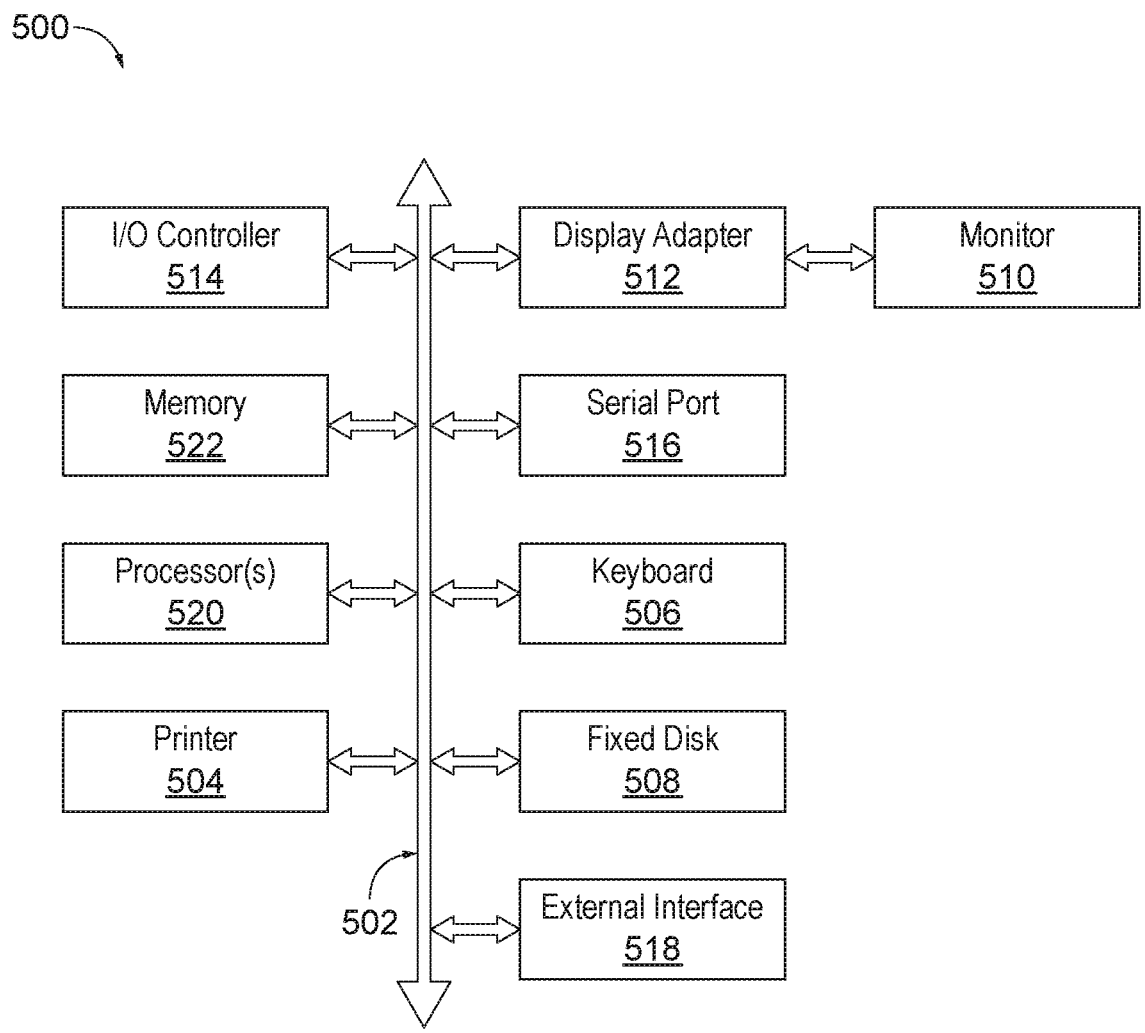
FIG. 5 is a flow chart or flow diagram illustrating a method, process, operation, or function(s) that may be implemented by an embodiment of the inventive system and methods in order to allow a user to register their eyeglasses with a vendor or with a service platform.

FIG. 5 is a diagram illustrating elements or components some of which may be present in a computing device, mobile device or system configured to implement a method, process, function, or operation in accordance with an embodiment of the invention. In accordance with one embodiment of the invention, the system, apparatus, methods, processes, functions, and/or operations described herein for assisting a user to either not lose their glasses or other item, or to more easily find them when misplaced, may be wholly or partially implemented in the form of a set of instructions executed by one or more programmed computer processors such as a central processing unit (CPU) or microprocessor. Such processors may be incorporated in an apparatus, server, client, mobile phone, or other computing or data processing device operated by, or in communication with, other components of the system. The set of instructions or executable code may be stored in or on a non-transitory computer readable medium (such as a data storage device, magnetic storage device, etc.).

As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

As noted, in some embodiments, the system and methods described herein may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module (e.g., a function or process related to generating a user interface on the mobile device, configuring the heartbeat or other signal, configuring the type of alert generated by the device, triggering a GPS fix on the location of the device, mapping the presumed location of the misplaced item based on the location of the device, etc.).

As described herein, the logic contained in the software application installed in the mobile device may include instructions (software code) that when executed by a programmed processor, implement one or more of the following processes, functions, or permit the indicated user-configurable actions:
- a selection of the preferred type of alert (visual, audible, text, email);
- a selection of the conditions under which each type or the types of alerts are generated or not generated (based on one or more of Bluetooth signal strength, change in Bluetooth signal strength, events noted in a calendaring application, time since previous alert was generated, time since first alert generated, time since first detected decrease or increase in Bluetooth signal, etc.);
- a selection of when to initiate a first GPS fix using the available technology in the mobile device, typically expressed in terms of one or more of the Bluetooth signal strength, the relative Bluetooth signal strength compared to its initial strength, the type or stage of alert last generated, the amount of time since the Bluetooth signal first started decreasing, etc.;
- logic to control the initiation of subsequent GPS fixes should the first attempt fail or be inconclusive due to the location or surroundings;
- the presentation of information related to the GPS data to the user to enable them to return to the location where it is presumed they left their eyeglasses or other item (such as via text directions, display of a map, a phone call to the location of the glasses based on a reverse lookup of the location or a calendar entry, for example);
- the ability to send a text or email message to a number associated with the location (if this is practical and feasible).

Note that the Bluetooth module or other form of transmitting element may include a data storage capability, such as non-volatile memory. The memory may be used to store data that is communicated to the device in which the application is installed by a user after a successful pairing operation. The stored data may be placed into the module by the module manufacturer, frame manufacturer or frame seller. The data may include
- a unique identifier on the "chip" or module; this identifier may be constructed as a Unique 48-bit address (BD_ADDR);
  - This will usually be presented in the form of a 12-digit hexadecimal value;
  - First 24-bits—(OUI) Organization Unique Identifier (this identifies the manufacturer, in our case Fetch Eyewear);
  - The lower 24-bits—more unique part of the address (no two are the same);
- A code for the eyewear/frame model type (e.g., *Bella*, Charlie, Alex, etc.).

As described, in some embodiments, the combination of the eyeglasses and the mobile application may enable use of both a Bluetooth (BT or BLE) and GPS technology to provide two basic services:
- generate or trigger an alert or alerts when a user is leaving (or approaching) the vicinity of their eyeglasses or other item; and
- trigger a process to determine the approximate location of the eyeglasses or item using a GPS fix, store this information, and then present the location to the user as part of an alert or message informing the user that they have left their eyeglasses or other item behind.

Embodiments of the system and methods described herein utilize a Bluetooth transmitter module (such as a BLE) placed within the eyeglass frames to emit a "heartbeat" or other signal, which is received and interpreted by a software application installed on a mobile device, such as a smartphone. The software application controls the reception and processing of the received signal by the device and is configured to enable a user to be alerted when they leave the vicinity of their eyeglasses or are approaching their eyeglasses (as described herein, this alert may take the form of text messages, email, audible tones or a sequence of audible tones, or other suitable alerting technique). Preferably, a user notices an alert and is able to find and retrieve their eyeglasses.

However, in some situations (such as a noisy room, an event in which the user is busy participating, etc.), a user may not notice the alert or alerts until they have left the location where they placed their glasses (such as a hotel, restaurant, lobby, airport, etc.). In such cases, knowing that they are no longer in the vicinity of their eyeglasses is not sufficient to enable them to retrieve the glasses.

In such situations, embodiments of the invention utilize a combination of logic contained in the software application and the GPS technology contained in the mobile device to obtain the location of the device/person when they left (or were about to leave) the vicinity of the glasses (which is presumably nearby the actual location of the glasses). The obtained location may then be communicated to the user, along with one or more of a map, directions to the location, contact information for the location (if it corresponds to a restaurant, hotel, office, etc.), etc.

As described herein, the system and methods may benefit consumers who wear glasses, but for whom the glasses are not worn at times. For example, prescription glasses may be needed for driving or walking, but it may be necessary to remove the glasses when reading or performing tasks which require seeing things that are close. However, removing glasses to enable better close-up vision often results in losing track of the glasses by leaving them on a table, seat, or bus/taxi. Similarly, consumers who wear glasses for reading cannot safely wear them for driving, walking, etc. This means that in transitioning from a close-up task to walking or socializing, it is typically necessary to remove the glasses. These changes in eyeglass wearing often result in glasses being left in restaurants, taxis, and various rooms in offices and homes, thereby requiring a frustrating search. Note that one of the largest groups of consumers who will benefit from use of the described systems and methods are those who wear prescription and non-prescription sunglasses. This is because it is typical to remove sunglasses as one transitions from outdoors to indoors, and this often results in the sunglasses being misplaced.

As also described, the installed mobile application may be used to assist in determining the registered owner of eyeglass frames or of another protected item by contacting a remote server or platform operated by the manufacturer or distributor of the frames or by a third party. Personal information provided by a user during the registration process is collected in the manufacturer or distributor database to provide ability to determine an owner of an item and to contact them to arrange return of the item in future.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The code or instructions may be stored in a non-transitory computer readable medium, such as a memory of the mobile device.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A system, comprising:
an eyeglass frame having a bridge disposed between a first lens area and a second lens area, the first lens area being connected to a first temple, and the second lens area being connected to a second temple;
a module embedded or implanted in the eyeglass frame, the module being at least substantially waterproof as embedded or implanted in the eyeglass frame and including a transmitting element operating to transmit a signal which is received by a device, and further including a memory device configured to store identifying data including at least a serial number of the eyeglass frame;
a database configured to enable the eyeglass frame to be returned to a user, based on at least the identifying data, if the eyeglass frame is found by another person;
a processing device configured to execute an application, wherein the processing device is configured to:
display a user interface configured to receive input information;
define an alert to be generated by the processing device or a device coupled to the processing device in response to a detection or a lack of detection of the signal transmitted by the module, wherein:
the alert indicates a type of notification to generate;
the alert indicates a triggering event for the type of notification; and
the alert is based on the input information;
receive, from the module, a signal indicative of a location of the eyeglass frame at a point in time;
determine that the user has left or is about to leave a vicinity of the eyeglass frame;
determine whether the module is in communication with the processing device;
in response to the module being in communication with the processing device:
determine the location of the eyeglass frame based on the location information; and
generate the alert, wherein the alert includes a first route for the user to travel from a current location of the user to the location of the eyeglass frame;
in response to the module not being in communication with the processing device:
determine a last known location of the eyeglass frame based on the location information at the point in time; and generate the alert, wherein the alert includes a second route for the user to travel from the current location of the user to the last known location of the eyeglass frame.

2. The system of claim 1, wherein a type of the alert is one or more of a notification, a text message, an audible tone or tones, an image, or a haptic alert.

3. The system of claim 1, wherein the triggering event for the alert is a loss of detection of the received signal or a specified decrease in a strength of the received signal relative to an initial value.

4. The system of claim 1, further comprising:
a Global Positioning Satellite (GPS) technology configured to determine the location of the device; and
a location determining technology configured to determine a reduction in signal strength of the received signal below a specified amount or below a relative strength compared to an initial value.

5. The system of claim 1, wherein the triggering event for a type of the alert is:
a strength of the received signal below a specified level;
a reduction in the strength of the received signal by a specified amount or percentage from an initial value of the received signal; or
an increase in the strength of the received signal by a specified amount or percentage from the initial value of the received signal.

6. The system of claim 1, further comprising executable instructions which enable accessing a user's calendar or information related to a meeting or appointment, and in response modifying the alert based on a calendar or other information.

7. The system of claim 1, further comprising executable instructions which enable the user to activate a recovery assistance service for the eyeglass frame.

8. The system of claim 1, further comprising executable instructions which enable the user to configure an aspect of the module relating to a transmission of the signal of the module.

9. The system of claim 1, further comprising executable instructions which enable the user to register the eyeglass frame with a remote data processing platform, the remote data processing platform including a capability to execute a service to assist in the recovery of the eyeglass frame.

10. The system of claim 1, wherein the module is slidably retained within a recessed portion of the first temple or the second temple of the eyeglass frame.

11. A method, comprising:
providing a user with an eyeglass frame having a bridge disposed between a first lens area and a second lens area, the first lens area being connected to a first temple, and the second lens area being connected to a second temple;
providing the user with a module embedded or implanted into the eyeglass frame, the module being substantially waterproof as embedded or implanted in the eyeglass frame and including a transmitting element operating to transmit a signal received by a mobile device;
providing the user with a memory device that is integrated with the module and configured to store identifying data suitable for identifying at least the eyeglass frame and the user;
providing a database configured to enable the eyeglass frame to be returned to the user, based on at least the identifying data, if the eyeglass frame is found by another person;
displaying a user interface configured to receive input information;
defining an alert to be generated by a processing device or a device coupled to the processing device in response to a detection or a lack of detection of the signal transmitted by the module, wherein:
the alert indicates a type of notification to generate;
the alert indicates a triggering event for the type of notification; and
the alert is based on the input information;
receiving, from the module, a signal indicative of a location of the eyeglass frame at a point in time;
determining that the user has left or is about to leave a vicinity of the eyeglass frame;
determining whether the module is in communication with the processing device;
in response to the module being in communication with the processing device:
determine the location of the eyeglass frame based on the location information; and
generate the alert, wherein the alert includes a first route for the user to travel from a current location of the user to the location of the eyeglass frame;
in response to the module not being in communication with the processing device;
determine a last known location of the eyeglass frame based on the location information at the point in time; and
generate the alert, wherein the alert includes a second route for the user to travel from a current location of the user to the last known location of the eyeglass frame.

12. The method of claim 11, wherein a type of the alert is a notification, a text message, an audible tone or tones, an image, or a haptic alert.

13. The method of claim 11, wherein the triggering event for the alert is:
a loss of detection of the received signal; or
a specified decrease in a strength of the received signal relative to an initial value.

14. The method of claim 11, further comprising:
determining the location of the eyeglass frame using a Global Positioning Satellite (GPS) technology; or
determining the location of the eyeglass frame by identifying a reduction in signal strength of a received signal below a specified amount or below a relative strength compared to an initial value.

15. The method of claim 11, wherein the triggering event is:
a strength of the received signal below a specified level;
a reduction in the strength of the received signal by a first specified amount or percentage from an initial value of the received signal; or
an increase in the strength of the received signal by a second specified amount or percentage from the initial value of the received signal.

16. The method of claim 11, wherein the processing device includes a source capable of providing an auditory or visual alert.

17. The method of claim 11, further comprising:
transmitting, by the module, the signal received by the mobile device; and
receiving, by the module, the signal transmitted by the mobile device, wherein the mobile device is configured to transmit a signal to the module in response to the detection or lack of detection of the signal transmitted by the module.

18. The method of claim 17, wherein;
the processing device includes a source capable of providing an auditory or visual alert; and
in response to the signal transmitted by the mobile device, the source is caused to provide the auditory or visual alert.

19. The method of claim 11, further comprising enabling the user to register the eyeglass frame with a remote data processing platform, the remote data processing platform including a capability to execute a service to assist in a recovery of the eyeglass frame.

20. The method of claim 11, wherein the module is slidably retained within a recessed portion of the first temple or the second temple of the eyeglass frame.

* * * * *